R. & N. HARRIS.
PNEUMATIC TIRE AND INFLATION MEANS THEREFOR.
APPLICATION FILED DEC. 10, 1915.

1,185,660.

Patented June 6, 1916.

Inventors
Rebecca Harris
Nathan Harris

By *T. K. S. Bryant*,
Attorney

UNITED STATES PATENT OFFICE.

REBECCA HARRIS AND NATHAN HARRIS, OF NEWARK, NEW JERSEY.

PNEUMATIC TIRE AND INFLATION MEANS THEREFOR.

1,185,660.     Specification of Letters Patent.     Patented June 6, 1916.

Application filed December 10, 1915. Serial No. 66,229.

*To all whom it may concern:*

Be it known that we, REBECCA HARRIS and NATHAN HARRIS, citizens of the United States, and residents of the city of Newark, county of Essex, and the State of New Jersey, have invented certain new and useful Improvements in Pneumatic Tires and Inflation Means Therefor, of which the following is the specification.

The primary object of the invention is the provision of a plurality of inflatable members within the shoe or casing of a tire whereby in the event of a puncture, the injury will be only local and the remainder of the tire will be unaffected thereby.

A further object of the device is to provide a plurality of inflatable members adapted to take the place of the ordinary inner tube in a pneumatic tire, the same being provided with means whereby any of the said members may be simultaneously inflated or deflated at will.

A still further object is to provide a single inflation conduit for a plurality of pneumatic members, each of the latter having an individual normally closed valve within the said conduit while a manually operable means is arranged within the conduit for opening the said valve simultaneously at the will of the operator.

With these general objects in view and others that will appear as the nature of the invention is better understood, the same consists in the novel construction, combination and arrangement of parts hereinafter more fully described, illustrated in the accompanying drawings, and then claimed.

Figure 1:
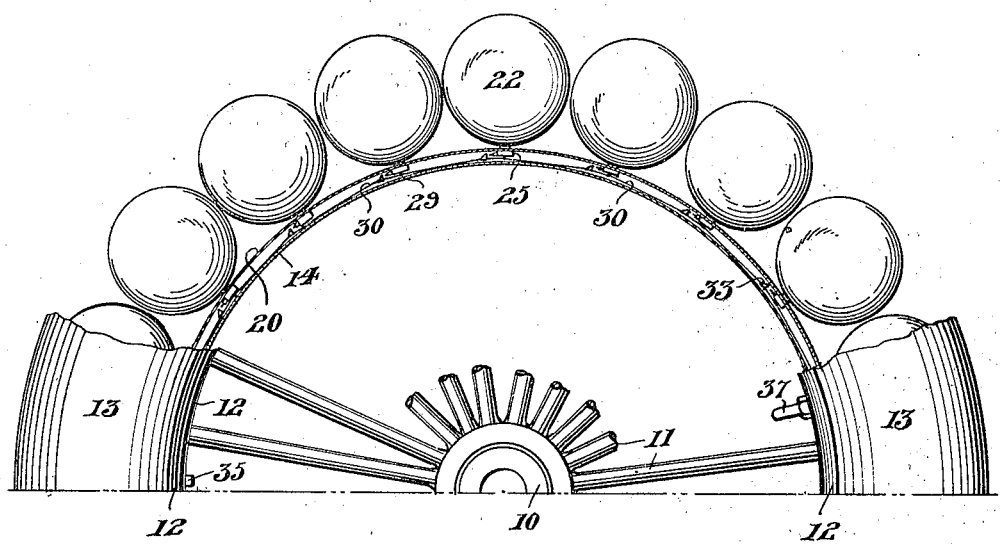
Figure 3:
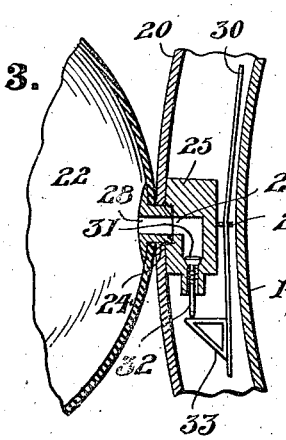
Figure 4:
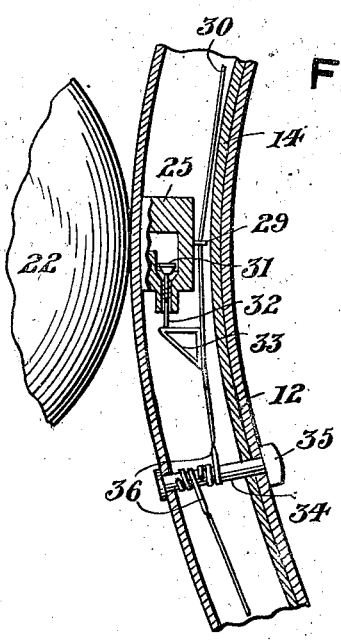
Figure 2:
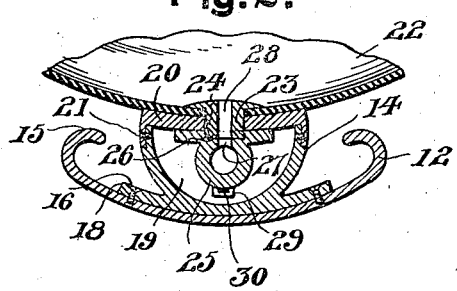

In the drawings forming a part of this application and in which like designating characters refer to corresponding parts throughout the several views:—Figure 1 is a side elevation of one-half of a pneumatic wheel of the present construction, partially broken away and partly in section. Fig. 2 is a radial transverse sectional enlarged detail view through the rim conduit valve and adjacent portion of one of the pneumatic members. Fig. 3 is a central longitudinal sectional view through a portion of the conduit and one of the inflation valves and the adjacent portion of the pneumatic member attached thereto, and, Fig. 4 is a view similar to Fig. 3, with a portion of the valve and pneumatic member in side elevation and showing the operating means for releasing the valves.

In the present embodiment of the invention, the same is herein illustrated in connection with a wheel having a hub 10, spokes 11 and the usual form of clencher rim 12 in which an outer shoe or casing 13 of a pneumatic tire is adapted to be removably arranged as illustrated in Fig. 1 of the drawings. An annular conduit 14 is carried centrally of the inner face of the rim 12 intermediate the side flanges 15 thereof, being secured in position by means of screws 16 extending through opposite base flanges 18 of the said conduit. The conduit is provided with an inflation chamber 19 therein substantially semi-circular in cross-section, the diametrical side of the conduit being closed by an annular plate 20 removably attached to the side walls of the conduit by means of the screws 21, the said plate 20 being slightly concaved longitudinally thereof.

A plurality of spherical pneumatic members 22 are adapted for positioning upon the conduit plate 20 in substantial contact with each other, being maintained upon the said plate by having the nipple 23 of each pneumatic member positioned within a radial perforation 24 in the said plate.

A valve casing 25 is provided for each of the pneumatic members 22 being secured within the conduit 14 to the inner face of the plate 20 thereof by means of the threaded inner end 26 of the adjacent nipple 23, being screw-threaded thereinto, each of the said casings having an inflation port 27 arranged in alinement with the bore 28 of the adjacent nipple 23. A metallic guide loop 29 is carried upon the bottom of each valve casing 25 and is arranged with a rectangular opening therethrough within which a flat metallic operating band 30 is slidably arranged. the corresponding rectangular form of the band and loop opening being adapted to prevent the band from revolving during the longitudinal shifting thereof.

A normally resiliently closed valve 31 is provided within each casing 25 having an outwardly projecting stem 32, the latter being positioned within the path of movement of an adjacently arranged projecting substantially triangular lug 33 carried by the outer face of the said flat band 30. An operating shaft 34 is radially journaled through the conduit 14 and rim 12 and is provided with a rectangular turn head or wrench hold member 35. The band 30 extends circumferentially of the rim 12 within the conduit 14 slidably arranged through each of the valve loops 29, the free end portions 36 of the said band being given a slight turn adjacent the shaft 34 and then flatly wound thereon in opposite directions with the terminal ends secured to the said shaft as illustrated in Fig. 4.

With all of the valves 31 normally closed as shown in Figs. 1 and 3 of the drawings, the inflation chamber 19 of the conduit 14 may be filled with compressed air through a usual form of inflation stem 37 communicating therewith. It will be understood that the pneumatic members 22 being arranged within the shoe 13 will be inflated from the inflation chamber 19 through the valve passages 27 and 28 until the pneumatic members 22 are all fully inflated, filling the shoe 13 sufficiently to form a tread surface. By slidably rotating the shaft 34 through the agency of its head 35 in the required direction to force the lugs 33 against the valve stems 32, it will be seen that all of the valves 31 will be simultaneously unseated for allowing a deflation of the pneumatic members 22. Upon revolving the shaft 34 in a reverse direction, the lugs 33 are released from the stems 32 and the spring-pressed valves 31 become seated in their closed positions. The band 30 extending entirely through the conduit 14 with its ends secured to the shaft 34 as herein illustrated, it will be evident that upon revolving the shaft in either direction, that one end of the band 30 will be wound thereon while the other is being unwound therefrom, thus longitudinally shifting the band 30 bodily in either direction desired dependent upon which direction the shaft 34 is revolved. A device is thus arranged whereby a plurality of pneumatic members may be simultaneously inflated as well as deflated, the deflating means being arranged for ready operation with the valve shifting mechanism thereof entirely inclosed and unobstructed from view.

What is claimed as new is:—

1. A device of the class described, comprising in combination with a clencher rim adapted for the reception of a tire shoe, an annular conduit having opposite longitudinally arranged flanges secured to the inner face of the said rim intermediate the opposite edges thereof and provided with an inflation chamber therein, the said conduit being substantially semi-circular in cross-section and having a slightly concaved closure plate at its outer periphery provided with spaced centrally arranged perforations therethrough, pneumatic members provided with inflation nipples secured within the said perforations, a valve casing for each of the said nipples secured within the conduit to the inner face of the said plate, with its outlet opening in operative alinement with the said nipple, a loop having a rectangular opening carried by the bottom of each of said casings, a normally resiliently closed valve within each of the said casings having a stem projecting therefrom, a radially arranged shaft journaled through the said rim and conduit, a flat metallic band longitudinally shiftably arranged through the said loops and having its opposite ends wound in opposite directions upon and secured to the said shaft, and lugs projecting from the said band and having paths of movement in the planes of the said valve stems.

2. A tire inflation means comprising an annular conduit substantially semi-circular in cross-section having a removable slightly concaved cover plate arranged with nipple receiving perforations therethrough, the said conduit having an inflation chamber therein, inflation valves within the said conduit attached to the said plate underlying the said perforations, normally closed valves within the said casings having outwardly projecting operating stems extending in the same general direction, rectangular loops upon the said casings, an operating shaft journaled through the said conduit, a band rectangular in cross-section slidably and non-rotatably arranged through the said lugs and having its opposite end portions laterally turned and wound in opposite directions upon the said shaft with the free ends of the said band secured thereto, and valve opening triangular shaped lugs projectingly carried by the said band within the path of movement of the said valve stems.

3. A device of the class described comprising a wheel rim, an inflating conduit positioned outwardly thereof and having an outwardly arranged annular cover plate slightly arcuate in cross-section provided with perforations, pneumatic members seated upon said curved plate, inflation nipples carried by said pneumatic members extending through the said perforations and having inwardly projecting threaded end portions, a separate valve casing for each of the said pneumatic members arranged within the said conduit upon the said threaded nipple ends contacting the said plate, an operating member for the said valves longitudinally shiftably arranged within the said conduit, rotation preventing loops for the said operating member carried by the said valve casings, an operating shaft journaled through the said conduit intermediate spaced ones of the said pneumatic members operatively connected to the opposite ends of the said operating member, and a turn head upon the said shaft inwardly of the said rim.

REBECCA HARRIS.
NATHAN HARRIS.

Witnesses:
BEN HARRIS,
JACOB SIFF.